Patented Aug. 26, 1941

2,253,518

UNITED STATES PATENT OFFICE 2,253,518

METHOD OF TREATING EGG WHITES

Louis E. Hess, San Antonio, Tex., assignor to Joe Lowe Corporation, New York, N. Y., a corporation of Delaware No Drawing. Application September 9, 1938, Serial No. 229,092

13 Claims. (Cl. 99—210)

The present invention relates generally to a process of treating the whites of an egg to produce an improved dried egg white, and it has particular relation to a process of treating such whites without fermentation and without the addition of large amounts of foreign chemical substances, whereby the finished product has superior whipping characteristics over that of the natural egg white, is substantially odorless, is completely soluble in water, and is substantially free from deterioration over long periods of time at normal temperatures.

Statistics show that the production of eggs in this country is highly seasonal, and that upwards of fifty percent of the entire production of eggs during one calendar year is laid during the months of March, April, May and June of each year. During this period, which may vary somewhat in different parts of the country due to climatic conditions, the quality of the eggs laid is at the highest point, and the price is consequently at the lowest point. Statistics further show that the egg consumption in this country is substantially uniform throughout each month of each calendar year, which means that large users of eggs commercially are required to secure their requirements during the short seasonal period when production is at its optimum and the price is at the minimum. Consequently, the egg industry has been required to develope certain ways and means for storing or treating the excess quantity of eggs laid during the seasonal period above-mentioned for use during the remainder of the year when production is low, quality poor and the price is high.

One of the earliest methods devised for the preservation of such excess quantity of eggs was the storing of whole eggs in a liquid solution, such as water-glass, sodium silicate, etc., which sealed the open pores in the egg shell, thus preventing the loss of moisture and carbon dioxide inherent in the egg and necessary to its preservation, and also preventing the bacterial contamination of the egg by the surrounding air. Another method was the storage of whole eggs under refrigerated conditions, but history shows that this treatment was insufficient to preserve both the quality and characteristics of a fresh egg, as evaporation losses from the egg through its shell caused deterioration by the loss of natural carbon dioxide present in the egg. To overcome this inherent defect in the storage of whole eggs, various other methods were devised, such as coating the individual eggs with impervious films and storing in refrigerated atmospheres containing large added amounts of carbon dioxide gas, but this did not prove entirely satisfactory.

The next development in the egg industry was the storing of such excess eggs by first removing the shell and freezing the whole egg, and thereafter maintaining the same in a frozen state until needed when the frozen egg was thawed out and used in the same manner as a fresh egg. This method also was unsatisfactory for a number of reasons, to-wit: there was bacterial growth; the extreme cold temperature separated out some of the chemical constituents, such as lutein, which never returned upon thawing to its original chemical composition in the mass; and osmosis changed the distribution of water in the egg so that the yolks thinned out. To overcome these disadvantages various other methods were devised which consisted substantially of adding to the whole egg large quantities of foreign materials, such as, for example, sucrose, invert sugar, glycerine, vegetable gums, etc. These chemical additions prevented some of the aforementioned alterations in the chemical composition of the eggs, but the resultant mixtures were no longer eggs, but mixtures of eggs and other chemicals, which mixtures were incapable of use in place of and for the same purposes as fresh eggs. However, products using such mixtures were somewhat different from the same products which were made with fresh eggs, and the adulterated mixtures had to be sold and labeled as such and could not be sold as pure egg mixtures.

Thereupon, the egg industry turned to the separation of whole eggs into yolks and whites, and the storage of the separated parts separately under refrigerated conditions. Also came the treatment of these separated parts of the egg with chemical additions such as hereinabove referred to with the result that the final product was still an adulterated egg mixture, and had to be sold as such.

The next development in the treatment of eggs was the drying of whole eggs, and the drying of separated yolks and whites closely followed. No difficulties were encountered in the drying of egg yolks. However, when whole eggs were dried, or egg whites were dried separately, serious trouble arose. While no substantial difficulties were encountered in the actual process of drying of the egg whites per se, the finished product was very unsatisfactory for a number of reasons, namely, the thick part of the natural white was difficult to dry because of its high viscosity, which required more heat to dry the same and thereupon became insoluble; the final product had very poor whipping qualities; and was inferior to and could not be used in place of fresh eggs in a great many instances. In an effort to overcome these known disadvantages of drying egg whites numerous developments have been made, namely, fermentation of the egg white before drying, but because of the lack of bacterial control in the product during the fermentation period, the final product had a highly offensive odor; the control of fermentation of the egg white by the addition of various adulterating chemicals followed but they remained and appeared in the final product; and then came the addition of enzymes and vegetable gums and/or other added chemical substances to the egg whites, all of which caused adulteration and the final product could not be used as a substitute for fresh egg white in a majority of instances. All of the above disadvantages are obviated by the treatment of egg whites in accordance with the present invention, and the resultant product is superior in whipping and keeping qualities to that of a fresh egg white.

An object of the present invention is to provide an efficient, economical and sanitary method of producing a dried egg white.

Another object of the invention is the provision of a method of producing a dried egg white without fermentation.

A further object of the invention is to provide a method of producing dried egg white without the addition of large amounts of added foreign chemicals.

Another object of the invention is the provision of a method of producing a dried egg white in which the natural enzymes present therein are used to convert the thick part of the egg white to thin white.

A further object of the invention is the provision of a method of producing egg white in which control of the hydrogen ion concentration, time and temperature are used to produce a superior product.

Another object of the invention is to provide a method of producing a dried egg white in which rapid removal of the natural carbon dioxide gas present therein permits natural enzymatic action.

A further object of the present invention is to provide a method of producing a dried egg white of such character that the insoluble matter may be readily separated by the application of centrifugal force.

Another object of the invention is the provision of a method of producing a dried egg white in which bacterial growth is prevented to an extent sufficient to obviate fermentation both in the liquid white and in the dried product.

A further object of the invention is to provide an odorless dried egg white that consists entirely of dehydrated natural ingredients of a fresh egg containing only small added quantities of a non-toxic edible acid.

Another object of the invention is the provision of an odorless dried egg white which is substantially free of partially decomposed protein.

A further object of the invention is the provision of an odorless dried egg white that is of a crystal clear transparent amber color and completely soluble in water.

Another object of the invention is to provide an odorless dried egg white that is characterized by its hydrogen ion concentration and its ability to withstand deterioration over long periods of time at normal atmospheric temperatures.

A further object of the invention is the provision of a dried egg white which is completely soluble in water and is superior to the white of fresh eggs in its whipping qualities.

Various other and further objects and advantages of the invention, which result in simplicity, economy and efficiency, will be apparent from the following detailed description, wherein a preferred form of practicing the invention is described.

Under normal operating conditions it is the customary practice to secure fresh eggs, by that I mean eggs that are not more than one week old. These eggs are then stored under refrigerated conditions at a temperature of approximately thirty degrees F. for a period of at least twenty-four hours, or until such time as may be required to insure an equalization of this temperature throughout the egg. This pre-chilling step performs three functions, namely: (1) it halts and suspends bacterial growth, and thus keeps the bacteria count at a minimum; (2) it permits better separation of the yolk and the whites by accentuating the different viscosities of these two principal components of the egg body; and (3) it permits candling and separating at room temperatures without substantial rise in the temperature of the egg parts thus keeping bacterial growth suspended during these operations.

After the eggs are removed from the refrigerated storage room, they are candled, broken and separated into yolks and whites. In the separation of the yolks and whites the usual precautions are taken to prevent bacterial contamination.

The fresh egg white, with which we are concerned in this application, is composed principally of two parts, to-wit: a thick white, which is that portion of the white of an egg that surrounds the yolk, and a thin white, which is that portion of the white of an egg that is adjacent to the shell. There are also stringy materials present in the whites of eggs, such as the chalaza and the membrous sacks, which surround both the thick and thin white. The hydrogen ion concentration of the combined thick and thin white at this point is normally found to be between 8.4 and 8.6, indicating that the egg white in its natural state is alkaline in character.

Egg white is a protein consisting chiefly of albumen, which per se is a substance of great value and is used extensively throughout substantially all industries. Consequently, eggs, which contain large quantities of albumen, provide the largest single source for this material.

In the food industry albumen is used, among other things, in the manufacture of candies, meringues, baked goods and especially those baked goods where a light and fluffy product is desired. The primary reason why albumen is so extensively used in the food industry is that it produces an emulsion when whipped with air and greatly increases in volume, thereby imparting a fluffy character to the final product in which it is so used. It is therefore important that albumen, procured from dried egg whites, has maximum whipping or beating properties.

The heavy thick white does not have the whipping properties of the thin white, either in its original fresh state or when dried as thick white. Consequently, it is essential in any commercial process for the treatment of whole egg white that the thick white be reduced to thin white before drying.

The cold egg white, having a hydrogen ion concentration of 8.4 to 8.6 and a temperature of thirty degrees F., after candling and separation at normal room temperatures, has increased in temperature about ten degrees F. or to a temperature of approximately forty degrees F. during such operations. I now rapidly raise the temperature of the egg white to approximately seventy degrees F. It is important that this rise in temperature be brought about rapidly, thus preventing bacterial growth which occurs if normal heating methods are used. One very satisfactory method of obtaining this rapid rate of heat transfer to the egg white is by passing the egg white through a tubular milk heater in which the heated water is thermostatically controlled to about one hnudred and forty degrees F. This rapid increase in the temperature of the egg white facilitates subsequent reaction by lowering the viscosity of the entire mass. With this lower viscosity and increase in temperature most of the natural carbon dioxide gas is liberated, which gas is always present naturally in fresh egg white. The removal of the carbon dioxide, which has an inhibiting effect on the natural enzymes of the egg, permits their normal function.

The resultant material is now transferred to a suitable glass-lined or other non-corrosive covered container equipped with mechanical stirring means to permit thorough and constant stirring of the mass. The mass, while being stirred, is now carefully neutralized with a solution of any non-toxic edible mineral or organic acid until the hydrogen ion concentration is 7.0. Hydrochloric, tartaric, lactic, phosphoric, citric, acetic acids may be employed in the neutralization of the mass, and they should be added carefully under agitation to prevent any excessive concentration of the added acid solution at any point in the mixture. Excessive concentration will cause coagulation of the albumen at the point where such excess exists. It is further very important at this step in the process not to add any excess acid to the mixture as such excess acid will destroy the function of the natural enzyme present in the egg white per se. The purpose of the neutralization is to allow the natural enzyme present, which does not function in the alkaline medium of the egg white per se, to reduce the thick white to thin white. This neutralized mass now has a hydrogen ion concentration of 7.0. Furthermore, bacterial growth is inhibited in this neutral mixture, and enzymatic action is promoted. Thus, it will be apparent that the length of time the mixture is permitted to remain in its natural alkaline state after separation is relatively short, thereby correspondingly reducing the opportunities for bacterial contamination in the egg white mixture at this point in my process.

This mixture, which now has a hydrogen ion concentration of 7.0, is reheated to approximately 90 degrees F. for a period of time sufficient to convert all of the thick white to thin white, making the resultant mixture a clear liquid of low viscosity. This conversion may be accomplished by standing small batches of about one hundred gallons of the mixture in a warm room, having a temperature of 90 degrees F. for a period of from twelve to twenty-four hours without fermentation. Of course, smaller batches may require less time and larger batches a correspondingly longer time, but care should be taken not to work with batches so large that the time required to effect the conversion is also sufficient to permit fermentation. It is further believed that the neutralized nature of the mixture also inhibits bacterial growth. The converted mixture will now be found to have a hydrogen ion concentration of 5.8, which change in concentration is brought about naturally and without fermentation, and is the result of enzymatic action of the natural enzymes of the original egg white. It will also be found that the glucosides and related products normally present in the fresh egg white, which are destroyed in the fermentation processes used for reducing the thick white to thin white, have not been altered and are present in this low viscosity mixture in their original forms and amounts. I believe this is due to the fact that the natural enzymes normally present in the egg white reduce the thick white by a hydrolysis of the proteins only, and do not act upon the other organic complex materials present in fresh egg white.

The resultant mixture upon reaching a hydrogen ion concentration of 5.8 is removed from the 90 degree F. temperature, and further treated with a dilute solution of the non-toxic edible acid previously used while said mixture is being vigorously agitated to cause a thorough mixing thereof in said mixture. For example, experience has shown that it requires about sixty ounces of 18 degree Baumé hydrochloric acid to change the hydrogen ion concentration in a batch of one hundred gallons of this egg white mixture from 5.8 to 5.0.

A hydrogen ion concentration of 5.0 is found to be the optimum for preparing edible egg white for drying purposes, and when such concentration has been brought about by practicing the various steps of my process, the final liquid mixture is of a low viscosity similar to water. Experience has also shown that merely reducing fresh egg white to the point where it has a hydrogen ion concentration of 5.0 without following the various steps of my process will neither produce a liquid mixture of such nature nor a dried egg white having the same desirable characteristics.

This liquid mixture having a hydrogen ion concentration of 5.0 still contains the insoluble stringy chalaza and membrous sacks originally present in the fresh egg white. The low viscosity of this liquid permits efficient, economical and sanitary separation of this undesirable insoluble matter. It can be removed in several ways: by gravity, including subsequent skimming; by centrifugal force; and by pressure, as in a filter press. By gravity the mixture is permitted to stand for a time sufficient to permit this insoluble material to separate from the clear liquid, after which it may be removed by skimming. With a one hundred gallon batch, I have found that a period of four hours is sufficient to bring about the required separation by gravity. It is understood that smaller or larger batches may require correspondingly different periods of time. By the use of centrifugal force, using super speed centrifugals, this undesirable material may be separated immediately. I have found that a Sharples high speed centrifugal separator can be used advantageously for this step in the process. Another method of instantaneous separation is by the use of pressure in a filter press equipped with non-corrosive and uncontaminating materials. In all of these processes of separation, the low viscosity of the liquid at this point is highly beneficial. It permits the clean separation of the insoluble matter with minimum entrainment losses of the valuable thin egg white. It also permits rapid separation, thus affording less opportunity for self contamination or contamination from outside sources of this final liquid product. The low viscosity of the liquid also is conducive to a spray drying operation because it will not have a tendency to clog the fine orifices of the spray gun nozzles used in such drying processes.

After such separation and removal of the undesirable insoluble matter, the remaining final liquid mix is substantially clear, odorless and of very low viscosity. Such liquid material may now be dried by pouring the same into shallow pans and subjecting the pans and contents to a temperature slightly below the coagulating temperature of the material. Any of the many commercial egg white pan driers may be used satisfactorily. The material when dried in this manner is in a thin layer, and being very brittle is broken into small fragments when removed from the pans, which fragments are known in the trade as "flakes". Such flakes are clear, light amber in color and odorless. With spray drying, the liquid is forced through the nozzles of the spray drier into a heated chamber where the fine atomized particles of the liquid material are dried instantly, and fall to the bottom of the chamber as a fine powder. This powdery material is known in the trade as "sprayed egg white."

Both of these forms of finished dried egg white resulting from the practicing of the steps of my process have whipping qualities superior to those of natural fresh egg whites; are completely soluble in water; have substantially all of the natural dehydrated components of the original egg white, including the glucosides as shown by their copper reducing properties; are free of decomposed protein matter; are free of foreign chemical substances except for a small amount of a non-toxic edible acid which has been combined with the protein of said egg white; and also have the ability of withstanding normal temperatures over long periods of time without deterioration.

Although I have only described in detail one modification which the invention may assume, it will be apparent to those skilled in the art that the invention is not so limited, but that various other modifications may be made therein without departing from the spirit thereof or from the scope of the appended claims.

What I claim is:

1. The method of treating egg whites without fermentation which comprises rapidly heating the egg white to between seventy and eighty degrees F. to reduce its viscosity and liberate most of the natural carbon-dioxide gas present therein, adjusting the hydrogen ion concentration to 7.0 to permit the natural enzymes normally present in egg whites to liquefy the thick white to thin white, acidifying the substance by the addition of an edible acid until its hydrogen ion concentration has been reduced to 5.0, removing the insoluble matter, and then drying the resultant thin egg white substance.

2. The method of treating egg whites without fermentation which comprises heating the natural egg white rapidly to between seventy and eighty degrees F. to reduce its viscosity and liberate most of the natural carbon dioxide gas normally present therein, neutralizing the heated substance with a non-toxic edible acid, reheating the neutralized substance to a temperature of approximately ninety degrees F. and maintaining said temperature until the same has been reduced by enzymatic action of the enzymes normally present therein to the acid side, removing the insoluble matter, and then drying the resultant substance.

3. The method of treating egg whites without fermentation which comprises heating the natural egg white rapidly to between seventy and eighty degrees F. to reduce its viscosity and liberate most of the natural carbon dioxide gas normally present therein, neutralizing the heated substance with a non-toxic edible acid, reheating the neutralized substance to a temperature of approximately ninety degrees F. and maintaining said temperature until the same has been reduced by enzymatic action of the enzymes normally present therein to the acid side, acidifying the substance further by the addition of more of the non-toxic edible acid until its hydrogen ion concentration has been reduced to 5.0, removing the insoluble matter, and then drying the resultant product.

4. The method of treating egg whites without fermentation which comprises heating the natural egg white rapidly to a temperature of between 70 and 80 degrees F., neutralizing the resultant heated substance with a solution of a non-toxic edible acid to the point where the hydrogen ion concentration has been reduced to 7.0, reheating the neutralized substance to a temperature of approximately 90 degrees F. and maintaining said temperature until the hydrogen ion concentration has been reduced by enzymatic action to 5.8, acidifying the substance further by the addition of more acid until its hydrogen ion concentration has been reduced to 5.0, removing the insoluble matter from said substance, and then drying the resultant substance.

5. The method of treating egg whites without fermentation which comprises heating the natural egg white rapidly to a temperature of between 70 and 80 degrees F., neutralizing the resultant heated substance with a solution of a non-toxic edible acid to the point where the hydrogen ion concentration has been reduced to 7.0, reheating the neutralized substance to a temperature of approximately 90 degrees F. and maintaining said temperature until the hydrogen ion concentration has been reduced by enzymatic action to 5.8, acidifying the substance further by the addition of more acid until its hydrogen ion concentration has been reduced to 5.0, separating by gravity the insoluble matter from the substance, and then drying the final mixture.

6. The method of treating egg whites without fermentation which comprises heating the natural egg white rapidly to a temperature of between 70 and 80 degrees F., neutralizing the resultant heated substance with a solution of a non-toxic edible acid to the point where the hydrogen ion concentration has been reduced to 7.0, reheating the neutralized substance to a temperature of approximately 90 degrees F. and maintaining said temperature until the hydrogen ion concentration has been reduced by enzymatic action to 5.8, acidifying the substance further by the addition of more acid until its hydrogen ion concentration has been reduced to 5.0, separating by centrifugal force the insoluble matter from the resultant substance, and then drying the final substance.

7. The method of treating egg whites without fermentation which comprises heating the natural egg white rapidly to a temperature of between 70 and 80 degrees F., releasing the carbon dioxide gas normally present therein, neutralizing the resultant substance with a solution of a non-toxic edible acid to the point where the hydrogen ion concentration has been reduced to 7.0, reheating the neutralized substance to a temperature of approximately 90 degrees F. and maintaining said temperature until the hydrogen ion concentration has been reduced by enzymatic action to 5.8, acidifying the substance further by the addition of more acid until its hydrogen ion concentration has been reduced to 5.0, removing the insoluble matter from said mixture, and then drying the resultant product.

8. The method of treating egg whites without fermentation which comprises heating the natural egg white rapidly to a temperature of between 70 and 80 degrees F., neutralizing the resultant heated substance with a solution of a non-toxic edible acid to the point where the hydrogen ion concentration has been reduced to 7.0, reheating the neutralized substance to a temperature of approximately 90 degrees F. and maintaining said temperature until the hydrogen ion concentration has been reduced by enzymatic action to 5.8, acidifying the substance further by the addition of more acid until its hydrogen ion concentration has been reduced to 5.0, permitting the resultant product to stand until the insoluble matter has become separated from the liquid substance, skimming off said insoluble matter to leave a substantially clear watery liquid of low viscosity, and then drying such liquid.

9. The method of treating egg whites without fermentation which comprises chilling the natural whole egg to approximately 30 degrees F., separating the whites from the yolks, rapidly heating the separated whites to a temperature between 70 and 80 degrees F., neutralizing said whites with a non-toxic edible acid whereby the hydrogen ion concentration is reduced to 7.0, reheating the neutralized whites to a temperature of approximately 90 degrees F. and maintaining said temperature until the hydrogen ion concentration is reduced by enzymatic action to 5.8, acidifying the mixture further by the addition of more acid until its hydrogen ion concentration is reduced to 5.0, separating the insoluble matter from said mixture, and then drying the final product.

10. The method of treating egg whites without fermentation which comprises chilling the natural whole egg to approximately 30 degrees F., separating the whites from the yolks, rapidly heating the whites to a temperature of between 70 and 80 degrees F., neutralizing the heated whites with a non-toxic edible acid until the hydrogen ion concentration has been reduced to 7.0, reheating the neutralized whites to a temperature of approximately 90 degrees F. and maintaining said temperature until the hydrogen ion concentration is reduced by enzymatic action to 5.8, acidifying the mixture further by the addition of more acid until its hydrogen ion concentration is reduced to 5.0, separating the insoluble matter from said mixture, and then drying the resultant liquid product.

11. The method of treating egg whites without fermentation which comprises chilling the natural whole eggs to approximately 30 degrees F., separating the whites from the yolks, rapidly heating the whites to a temperature between 70 and 80 degrees F., neutralizing the heated whites with a dilute solution of a non-toxic edible acid until the hydrogen ion concentration has been reduced to 7.0, reheating the neutralized whites to a temperature of approximately 90 degrees F. and maintaining said temperature for a period of from twelve to twenty-four hours during which the hydrogen ion concentration has been reduced to 5.8 by enzymatic action, acidifying the mixture further by the addition of more of the dilute acid solution until its hydrogen ion concentration is reduced to 5.0, separating the insoluble matter from said mixture, and then drying the final liquid product.

12. The method of treating egg whites without fermentation which comprises chilling the natural whole egg to approximately 30 degrees F., separating the white from the yolk, rapidly heating the white to a temperature between 70 and 80 degrees F., neutralizing the heated white with a dilute solution of a non-toxic edible acid until the hydrogen ion concentration has been reduced to 7.0, reheating the neutralized whites to a temperature of approximately 90 degrees F. and maintaining said temperature for a period of from twelve to twenty-four hours during which the hydrogen ion concentration has been reduced by enzymatic action to 5.8, acidifying the mixture further by the addition of more of the dilute acid solution until its hydrogen ion concentration is reduced to 5.0, permitting the acidified liquid mixture to stand for a period of time until all of the insoluble matter has separated therefrom, removing the separated insoluble matter from said liquid mixture, and then drying the final liquid product.

13. The method of treating egg whites without fermentation which comprises chilling the natural whole egg to approximately 30 degrees F., separating the white from the yolk, rapidly heating the white to a temperature of between 70 and 80 degrees F., neutralizing the heated white with a dilute solution of a non-toxic acid while the same is undergoing constant agitation until the hydrogen ion concentration has been reduced to 7.0, reheating the neutralized white to a temperature of approximately 90 degrees F. and maintaining said temperature for a period from 12 to 24 hours during which the hydrogen ion concentration has been reduced by enzymatic action to 5.8, acidifying the mixture further by the addition of more of the dilute acid while the same is again undergoing constant agitation until its hydrogen ion concentration has been reduced to 5.0, permitting the acidified liquid mixture to stand for a period of approximately four hours to permit acidification to cause all of the insoluble matter to separate from the liquid mixture, removing the separated insoluble matter from said liquid mixture, and then drying the resultant product.

LOUIS E. HESS.